United States Patent
Protz

(10) Patent No.: US 9,910,146 B2
(45) Date of Patent: Mar. 6, 2018

(54) MEASURING APPARATUS FOR MEASURING THE TRAJECTORY OF A TARGET OBJECT

(71) Applicant: MBDA Deutschland GmbH, Schrobenhausen (DE)

(72) Inventor: Rudolf Protz, Hoehenkirchen-Siegertsbrunn (DE)

(73) Assignee: MBDA Deutschland GmbH, Schrobenhausen (DE)

( * ) Notice: Subject to any disclaimer, the term of this patent is extended or adjusted under 35 U.S.C. 154(b) by 334 days.

(21) Appl. No.: 14/441,652

(22) PCT Filed: Nov. 6, 2013

(86) PCT No.: PCT/DE2013/000651
§ 371 (c)(1),
(2) Date: May 8, 2015

(87) PCT Pub. No.: WO2014/071907
PCT Pub. Date: May 15, 2014

(65) Prior Publication Data
US 2015/0293218 A1  Oct. 15, 2015

(30) Foreign Application Priority Data
Nov. 9, 2012 (DE) .......................... 10 2012 022 040

(51) Int. Cl.
*G01S 13/06* (2006.01)
*G01S 13/86* (2006.01)
(Continued)

(52) U.S. Cl.
CPC .............. *G01S 13/86* (2013.01); *G01S 13/06* (2013.01); *G01S 13/58* (2013.01); *G01S 13/867* (2013.01); *H01Q 19/19* (2013.01)

(58) Field of Classification Search
CPC ................................ G01S 13/931; G01S 7/032
(Continued)

(56) References Cited

U.S. PATENT DOCUMENTS 3,331,072 A * 7/1967 Pease .......................... G01S 3/42
342/423
4,866,454 A  9/1989 Droessler et al.
(Continued)

FOREIGN PATENT DOCUMENTS

EP         0 281 042 A2   9/1988
WO     WO 01/63694 A1   8/2001

OTHER PUBLICATIONS

International Search Report (PCT/ISA/210) dated Mar. 14, 2014 with English-language translation (six (6) pages).
(Continued)

*Primary Examiner* — Timothy A Brainard
(74) *Attorney, Agent, or Firm* — Crowell & Moring LLP

(57) ABSTRACT

A measuring apparatus for measuring the trajectory of a target object includes a receiving device having a primary mirror and a secondary mirror; a first detector for detecting first electromagnetic radiation having a first wavelength and a second detector for detecting second electromagnetic radiation having a second wavelength. The primary mirror is designed to reflect the first electromagnetic radiation and the second electromagnetic radiation and to direct the radiation onto a focal region. The secondary mirror is arranged between the primary mirror and the focal region and is designed to reflect only the second electromagnetic radiation in the direction of the second detector. The first detector is arranged behind the secondary mirror in the focal region of the primary mirror.

15 Claims, 2 Drawing Sheets

(51) Int. Cl.
*H01Q 19/19* (2006.01)
*G01S 13/58* (2006.01)

(58) Field of Classification Search
USPC .......................................................... 342/52
See application file for complete search history.

(56) References Cited

U.S. PATENT DOCUMENTS

| | | | |
|---|---|---|---|
| 4,917,490 A * | 4/1990 | Schaffer, Jr. | F41G 3/326 |
| | | | 250/341.8 |
| 5,107,369 A | 4/1992 | Hendrickson et al. | |
| 5,214,438 A * | 5/1993 | Brusgard | F41G 7/008 |
| | | | 343/725 |
| 5,307,077 A | 4/1994 | Branigan et al. | |
| 6,295,034 B1 | 9/2001 | Brown et al. | |
| 2004/0119020 A1 | 6/2004 | Bodkin | |
| 2008/0008478 A1* | 1/2008 | Theis | G02B 23/06 |
| | | | 398/182 |
| 2010/0282941 A1* | 11/2010 | Mosier | G01S 17/66 |
| | | | 250/203.1 |

OTHER PUBLICATIONS

German-language Written Opinion (PCT/ISA/237) dated Mar. 14, 2014 (five (5) pages).

* cited by examiner

MEASURING APPARATUS FOR MEASURING THE TRAJECTORY OF A TARGET OBJECT

FIELD OF THE INVENTION

The invention relates to a measuring apparatus and a method for measuring the trajectory of a target object.

BACKGROUND OF THE INVENTION

For measuring the trajectory of a target object, for example a military missile such as a rocket or a projectile, radar systems can be used which can perform measurements with an accuracy in the mrad range. Such radar apparatuses are usually used in connection with C-RAM systems for monitoring and measuring the trajectory of artillery projectiles. This enables a positioning accuracy within several meters to be achieved.

Under certain circumstances it is desirable to determine trajectory data with higher accuracy. Knowledge of such accurate trajectory data is required, for example, when using so-called C-RAM systems, which serve for defending enemy artillery projectile attacks.

SUMMARY OF THE INVENTION

It is an object of the invention to measure the trajectory of a target object with high accuracy.

This object is achieved in accordance with the embodiments of the invention.

One aspect of the invention relates to a measuring apparatus for measuring the trajectory of a target object. The measuring apparatus can be part of a C-RAM system (counter rocket, artillery, mortar), for example. A C-RAM system can use anti-aircraft guns with special ammunition, missile or high-energy laser radiation as an effector. Directing this system and/or the methods used for fire control usually requires precise knowledge of the target coordinates of the target object.

According to one embodiment of the invention, the measuring apparatus comprises a receiving device having a primary mirror and a secondary mirror; a first detector for detecting first electromagnetic radiation having a first wavelength; a second detector for detecting second electromagnetic radiation having a second wavelength, wherein the primary mirror is designed to reflect the first electromagnetic radiation and the second electromagnetic radiation and to direct it onto a focal region; wherein the secondary mirror is arranged between the primary mirror and the focal region and is designed to reflect only the second electromagnetic radiation in the direction of the second detector; and wherein the first detector is arranged behind the secondary mirror in the focal region of the primary mirror.

The measuring apparatus comprises, in particular, a primary mirror capable of reflecting both kinds of electromagnetic radiation. In this manner, the system combines two measuring arrangements which are mechanically coupled so as to simplify the tracking movement of the receiving device and to increase measuring accuracy. With the described arrangement and the measuring method described below it is possible to determine the trajectory coordinates of artillery projectiles and other target objects with an accuracy of a few centimeters.

The focal region of the primary mirror can be a region in which the focus of the primary mirror is situated, or a region in which the primary mirror bundles the (first and second) electromagnetic radiation. In general, a mirror can be a device that is suitable to reflect the corresponding electromagnetic radiation almost completely (at least more than 50%, or more than 90%).

According to one embodiment of the invention, the first electromagnetic radiation is radar radiation. The receiving device can be a receiving antenna. The radar radiation can be radiation having a wavelength in the centimeter range.

According to one embodiment of the invention, the second electromagnetic radiation has a wavelength between 0.5 µm and 1.5 µm. The second electromagnetic radiation can be light and/or laser radiation. The second electromagnetic radiation can comprise infrared light, visible light and/or ultraviolet light.

The receiving device can comprise a telescope for light or laser radiation, which, at the same time, can bundle radar radiation using the primary mirror.

For example, the primary mirror can be coated with a coating that can reflect radar radiation as well as laser radiation or light. The secondary mirror can be coated with a coating that reflects only laser radiation or light, but is permeable to radar radiation. The secondary mirror can be made from a material that is permeable to radar beams so that they can impinge on the first detector.

According to one embodiment of the invention, the detector is designed to detect a position of the center of gravity of the first electromagnetic radiation impinging on the first detector. The second detector can also be designed to detect a position of the center of gravity of the second electromagnetic radiation impinging on the second detector. The first detector and/or the second detector can each be a four-quadrant detector. Each of the detectors, or one of the two detectors, can comprise a position-sensitive sensor.

According to one embodiment of the invention, the primary mirror is a parabolic mirror (having a positive focal length), and the secondary mirror is a hyperbolic mirror (having a negative focal length). The primary mirror can have a parabolic surface. The secondary mirror can have a hyperbolic surface. Both mirrors can have a coinciding optical axis which can define an optical axis of the receiving device.

According to one embodiment of the invention, the primary mirror has an opening through which the second electromagnetic radiation from the secondary mirror is reflected. The opening can be situated in the region of the primary mirror through which the optical axis of the mirrors passes through the primary mirror.

According to one embodiment of the invention, the measuring apparatus further comprises a radiation unit that is designed to radiate electromagnetic radiation having the second wavelength in the direction of an optical axis of the receiving device. In this manner, the target object can be illuminated or radiated by the measuring apparatus with the second electromagnetic radiation. The radiation device can be a laser radiation device for radiating a laser beam having the corresponding wavelength.

The radiation device can be (fixedly) fastened on the receiving device. Thus, the radiation device is pivoted together with the receiving device when the receiving device is directed at the target object.

According to one embodiment of the invention, the measuring apparatus is designed to determine, with a predefined angular accuracy (for example 0.5 mrad), an angular deviation of the receiving device from the target object by means of the first detector.

According to one embodiment of the invention, the radiation device is designed to radiate second electromagnetic radiation in an angular range that is greater than the angular accuracy (for example 1 mrad).

According to one embodiment of the invention, the measuring apparatus further comprises a semi-permeable mirror that is designed to reflect the second electromagnetic radiation in the direction of the second detector. The semi-permeable mirror can be designed to allow a third electromagnetic radiation to pass through. After the second electromagnetic radiation (for example light and/or laser radiation) has been reflected from the secondary mirror (and potentially has been radiated through the opening in the primary mirror), the second electromagnetic radiation can be directed through the semi-permeable mirror in the direction towards the detector. Other wavelength ranges (comprising the third electromagnetic radiation, for example light of a different wavelength) can be allowed to pass through in the direction of a camera, for example.

A reversed arrangement, in which the second electromagnetic radiation is allowed to pass through from a semi-permeable mirror to the second detector and with the semi-permeable mirror being designed to reflect a third electromagnetic radiation, is also possible.

According to one embodiment of the invention, the primary mirror and the secondary mirror are fixedly connected to one another and/or are combined to form a movable receiving device that can be directed at the target object. Thus, the receiving device can be directed at the target object for both types of electromagnetic beams.

According to one embodiment of the invention, the measuring apparatus further comprises a directing unit having actuators for directing the receiving device at the target object.

According to one embodiment of the invention, the directing unit comprises angle detectors for detecting the angular orientation of an optical axis of the receiving device. The target position of the target object can be determined from the signals of the angle detectors when the optical axis of the receiving device is directed at the target object.

According to one embodiment of the invention, the measuring apparatus further comprises a controller for receiving a first angular deviation of the first electromagnetic radiation from the first detector, and for receiving a second angular deviation of the second electromagnetic radiation from the second detector. The controller can be designed to determine how an optical axis of the receiving device has to be oriented to reduce the angular deviations of the two detectors.

Another aspect of the invention relates to a system for measuring the trajectory of a target object, which system comprises a measuring apparatus as described above and below, and a (separate) radar apparatus for radiating radar radiation as first electromagnetic radiation. The radar apparatus can also be used to determine a first rough target position for a first orientation of the receiving device.

Another aspect of the invention relates to a method for measuring the trajectory of a target object.

According to one embodiment of the invention, the method comprises the following steps: receiving first electromagnetic radiation reflected from the target object in a receiving device which comprises a primary mirror and a secondary mirror; reflecting the first electromagnetic radiation onto a first detector by means of the primary mirror; determining a rough position of the target object with a first accuracy from the signals of the first detector; directing the receiving device at the target object by means of the rough position; receiving in the receiving antenna a second electromagnetic radiation reflected from the target object; reflecting onto a second detector the second electromagnetic radiation by means of the primary mirror and the secondary mirror; determining, from the signals of the second detector, a fine position of the target object with a second accuracy that is greater than the first accuracy.

To measure the target coordinates of the target object, the target object is radiated from the ground with chronologically pulsed electromagnetic radiation. It is possible to use radiation having wavelengths in the centimeter range (radar radiation) as well as wavelengths in the range of from 0.5 to 1.5 μm (light, laser radiation).

Producing the first electromagnetic radiation can be carried out by means of a (separate) radar apparatus. Producing the second electromagnetic radiation can be carried out by means of a laser unit (integrated in the measuring apparatus).

The first and second radiations scattered back from the target object to the ground can be received by a receiving antenna and detectors or sensors arranged downstream of the receiving antenna. The receiving antenna can comprise a telescope arrangement having a primary mirror and a secondary mirror, wherein at least the primary mirror can reflect and bundle both types of electromagnetic radiation (i.e., the first and the second electromagnetic radiations).

The two detectors can each detect the first electromagnetic radiation and the second electromagnetic radiation, respectively, and can each determine a positional deviation and angular deviation, respectively, of the target from the respective detector and can generate corresponding signals therefrom.

By means of the received signals evaluated in a controller or electronics, the receiving antenna, with regard to the azimuth angle and elevation angle, is continuously directed at the target during the measurement in such a manner that optimal reception is established at any time. This can be performed by (only) the signals of the first detector, for example.

The angle coordinates of the target object can be determined using angle encoders or angle detectors attached on the rotation axles of a directing unit for the receiving device.

The determination of the distance from the target object can be carried out by measuring the run-time of the transmitted and received pulsed electromagnetic radiation, for example of the second electromagnetic radiation. The determination of the target distance can also be carried out by measuring the run-time of the pulses of an illumination laser (as laser unit).

Measuring the trajectory of the target object, for example a RAM target (RAM: rocket, artillery, mortar), can be carried out independently of a characteristic signature of the target object (i.e., the detailed radiation pattern thereof).

Exemplary embodiments of the invention are described in detail below with reference to the accompanying figures.

BRIEF DESCRIPTION OF THE FIGURES

Basically, identical or similar parts are designated by the same reference signs.

DETAILED DESCRIPTION OF EXEMPLARY EMBODIMENTS

Figure 1:
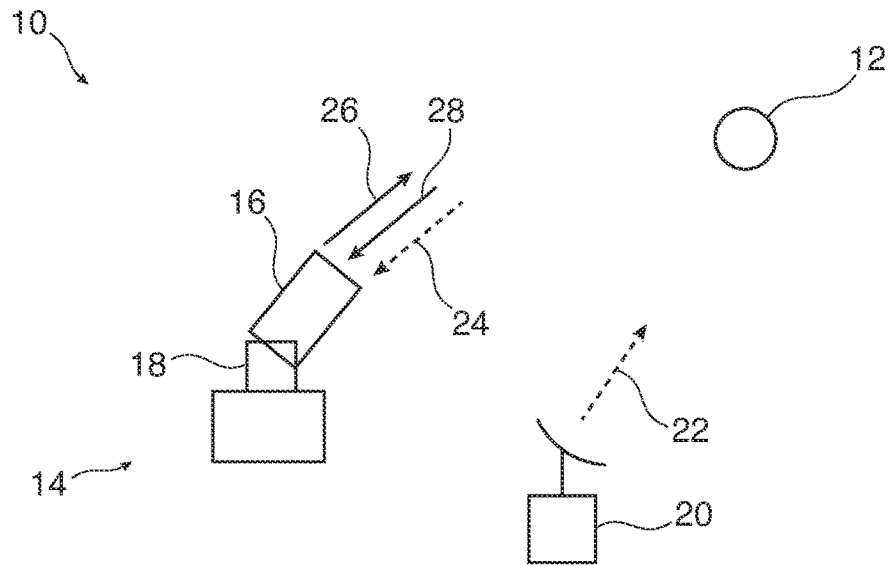
FIG. 1 shows a schematic view of a system for measuring the trajectory of a target object according to an embodiment of the invention.

FIG. 1 shows a system 10 for measuring the trajectory of a target object 12, which system comprises a measuring apparatus 14 having a receiving antenna 16 and a directing unit 18. The directing unit 18 can direct the receiving antenna 16 toward the target object 12. The target object 12 can be a missile, a rocket or an artillery projectile, for example.

The system further comprises a radar apparatus 20 that can radiate radar radiation 22 onto the target object 12, which can be electromagnetic radiation having a wavelength in the centimeter range.

The measuring apparatus 14 can capture radar radiation 24 reflected from the target object 12 and, in addition, can radiate laser radiation 26 onto the target object 12, and can also capture laser radiation 28 reflected from the target object 10.

Figure 2:
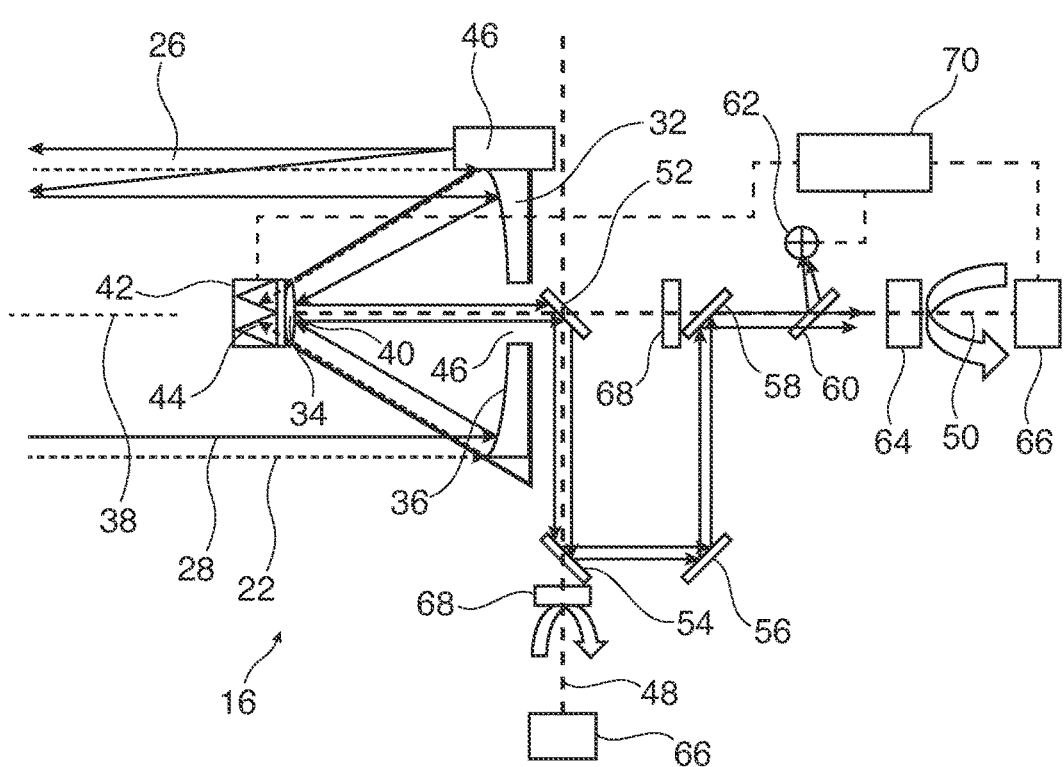
FIG. 2 shows a schematic view of a measuring apparatus for measuring the trajectory of a target object according to an embodiment of the invention.

The measuring apparatus 14 or the measuring arrangement is illustrated in FIG. 2 in greater detail.

The measuring apparatus 14 comprises the movable antenna 16 which has a telescopic construction formed from a primary mirror 32 and a secondary mirror 34, which are held by a joint mechanical structure or are fixedly connected to one another.

The primary mirror 32 is substantially composed of glass-ceramics and has a diameter of typically one meter. The primary mirror has a reflecting surface 36 in the shape of a paraboloid having a focal length of typically two meters. The surface 36 is provided with a metallic reflective coating which reflects, for example, 95% of the received radar radiation 22 and of the laser radiation 28.

The radiation 24, 28 received from the target object 12 is bundled by the primary mirror 32 onto the secondary mirror 34, which can be attached at a distance of approximately 2 meters before the primary mirror 32, for example just before the focus of the primary mirror 32. The optical axes 38 of the two mirrors 32, 34 can coincide and form an optical axis 38 of the receiving antenna 16.

The secondary mirror 34 as well is substantially composed of glass-ceramics and can have a surface 40 in the shape of a hyperboloid. The surface 40 is provided with a dielectric coating which is highly reflective for the laser radiation 28 in the wavelength range of the laser radiation used, but is highly permeable for the radar radiation 24 used. The glass ceramics used for the secondary mirror 34 is also highly permeable for the radar radiation 24.

A first detector 42 which includes four receiving devices 44 in a quadrant arrangement for measuring the received radar radiation 22 is attached on the back side of the secondary mirror 34.

Attached to the receiving antenna 16 is a laser unit (or an illumination laser) 46, which illuminates the target object 12 with laser radiation 26 when the optical axis 38 of the receiving antenna 16 is substantially directed at the target.

The laser radiation 28 scattered back from the target object 12 is received by way of the receiving antenna 16, is reflected from the primary mirror 32 onto the secondary mirror 34 and, as a bundled beam, is deflected through a hole or opening 46 arranged centrically (with respect to the axis 38) in the primary mirror 32 onto a position-sensitive detector 62 via the deflection mirrors 52, 54, 56, 58 and 60 mounted in the two rotational axes 48, 50 of the directing unit 18, and is focused on said detector 62.

The deflection mirror 60 can be designed as a wavelength-selective mirror so that light received therefrom and having wavelengths other than the laser wavelength of the illumination laser 46 can be used, for example, for observation purposes by use of a camera 64, and/or that laser radiation having wavelengths other than the laser wavelength of the illumination laser 46 can be radiated onto the target object 12 to combat it.

The directing unit 18 includes two actuators 66 (for example, electric motors) by which the receiving antenna 16 can be moved about the two rotational axes 48, 50. The measuring apparatus 14 further includes two angle detectors 68 which are mounted on the two rotation axles of the directing unit 18 of the receiving antenna 16 and by which the angular orientation of the receiving antenna 16 can be determined.

Controlling the actuators 66 is carried out by a controller 70 or electronics 70 which also receives and processes signals from the angle detectors 68. The controller 70 can also communicate and exchange information with the radar apparatus 20.

Figure 3:
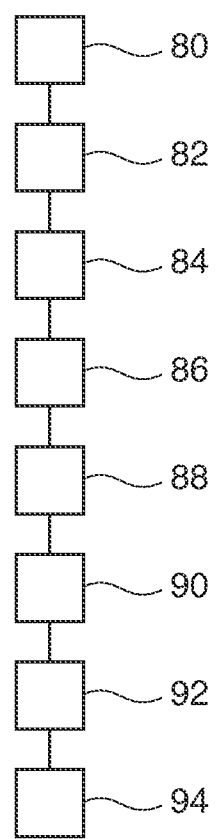
FIG. 3 shows a flow diagram for a method for measuring the trajectory of a target object according to an embodiment of the invention.

FIG. 3 shows a flow diagram for a method for measuring the trajectory of the target object 12.

In step 80, the radar radiation 22 is produced by way of the radar apparatus 20 which is separated from the measuring apparatus 14. The radar apparatus determines a first target position or target coordinates of the target object 12 with an accuracy of a few meters and transmits the target coordinates to the measuring apparatus 14 or the controller 70 thereof.

In step 82, the receiving antenna 16 of the measuring apparatus 14 is directed by way of the two-axis directing unit 18 at the target coordinates transmitted from the external radar apparatus 20. For this purpose, the controller 70 controls the actuators 66 correspondingly. The current orientation of the receiving antenna 16 can also be determined based on the signals of the angle detectors 68.

In step 84, the radar radiation reflected from the target object 12 in the direction of the measuring apparatus 14 is received by the receiving antenna 16 and is bundled onto the first detector 42 by the primary mirror 32. Based on the sensor signals of the detector 32, the controller 70 determines the angular deviation of the receiving antenna 16 from the target object 12 with a first accuracy of approximately 0.5 mrad. This can be carried out by way of differential phase measurements, for example.

In step 86, the antenna 16 then tracks the target object 12 accordingly by way of the directing unit 18 which is controlled by the controller.

In step 88, after the orientation in step 86, the target object 12 is radiated by way of the laser unit 46 with laser radiation 26, for example with pulsed laser radiation 26, which can lie in a wavelength range of from 0.5 to 1.5 μm. The pulse lengths of the laser pulses are typically only a few nanoseconds; the pulse repetition rate can be several hundred pulses up to one thousand pulses per second and/or the pulse energies can be several tens of mJ. The divergence of the emitted laser radiation 26 is typically 1 mrad.

In step 90, the laser radiation 28 reflected from the target object 12 in the direction of the measuring apparatus 14 is received by the receiving antenna 16 and is bundled and deflected onto the second detector 62 by the primary mirror 32, the primary mirror 34 and the subsequent deflection mirrors 52, 54, 56, 58 and 60. The signals received from the second detector 62, for example a position-sensitive sensor 62, are evaluated by the controller 70. Therefrom, the controller 70 determines the angle offsets or angular deviations of the receiving antennas 16 with an accuracy of a few μrad.

In step 92, an accurate position determination of the target object 12 is carried out by the controller 70 based on the signals of the angle detectors or angle encoder 68 and the angular deviations detected in step 90. Based on this data, the angular position of the target object 12 can be determined with an accuracy of a few microradians.

In step 94, the distance of the target object 12 from the controller is determined. This can be carried out via a run-time measurement of the laser pulses of the laser radiation 26, 28.

The steps 82 to 94 can be regularly repeated so as to measure or determine the trajectory of the target object 12. The time resolution of the measurement can result from the pulse repetition rate of the illumination laser 46.

It should be added that in the claims "comprising" does not exclude other elements or steps and that "one" or "a" does not exclude a plurality. It should further be noted that features or steps that have been described with reference to one of the above exemplary embodiments can also be used in combination with other features or steps of other exemplary embodiments described above. Reference signs in the claims are not to be regarded as limiting.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A measuring apparatus for measuring a trajectory of a target object, the measuring apparatus comprising:
    a receiving device having a primary mirror and a secondary mirror;
    a first detector configured to detect first electromagnetic radiation having a first wavelength;
    wherein the first detector is further configured to provide signals based on which a rough position of the target object with a first accuracy is determinable;
    a second detector configured to detect second electromagnetic radiation having a second wavelength;
    wherein the second detector is further configured to provide signals based on which a fine position of the target object with a second accuracy that is greater than the first accuracy is determinable;
    wherein the primary mirror is designed to reflect the first electromagnetic radiation and the second electromagnetic radiation and to direct said radiation onto a focal region;
    wherein the secondary mirror is arranged between the primary mirror and the focal range and is designed to reflect only the second electromagnetic radiation in the direction of the second detector; and
    wherein the first detector is arranged behind the secondary mirror in the focal region of the primary mirror.

2. The measuring apparatus according to claim 1, wherein the first electromagnetic radiation is radar radiation.

3. The measuring apparatus according to claim 1, wherein the second electromagnetic radiation has a wavelength between 0.5 µm and 1.5 µm.

4. The measuring apparatus according to claim 1, wherein the first detector is designed to detect a position of the center of gravity of the first electromagnetic radiation impinging on the first detector, and/or wherein the second detector is designed to detect a position of the center of gravity of the second electromagnetic radiation impinging on the second detector.

5. The measuring apparatus according to claim 1, wherein the primary mirror is a parabolic mirror and the secondary mirror is a hyperbolic mirror.

6. The measuring apparatus according to claim 1, wherein the primary mirror has an opening through which the second electromagnetic radiation from the secondary mirror is reflected.

7. The measuring apparatus according to claim 1, further comprising:
    a radiation unit that is designed to radiate electromagnetic radiation having the second wavelength in the direction of an optical axis of the receiving device;
    wherein the radiation unit is fastened on the receiving device.

8. The measuring apparatus according to claim 7, wherein the measuring apparatus is designed to determine, with a predefined angular accuracy, an angular deviation of the receiving device from the target object by way of the first detector;
    wherein the radiation device is designed to radiate a second electromagnetic radiation in an angular range that is greater than the angular accuracy.

9. The measuring apparatus according to claim 1, further comprising:
    a semi-permeable mirror that is designed to reflect the second electromagnetic radiation in the direction of the second detector; and/or
    wherein the semi-permeable mirror is designed to let a third electromagnetic radiation pass through.

10. The measuring apparatus according to claim 1, wherein the primary mirror and the secondary mirror are fixedly connected to one another and are combined to form a movable receiving device directable at the target object.

11. The measuring apparatus according to claim 1, further comprising:
    a directing unit having actuators for directing the receiving device at the target object.

12. The measuring apparatus according to claim 11, wherein the directing unit comprises angle detectors for detecting the angular orientation of an optical axis of the receiving device.

13. The measuring apparatus according to claim 1, further comprising:
    a controller for receiving a first angular deviation of the first electromagnetic radiation from the first detector and a second angular deviation of the second electromagnetic radiation from the second detector;
    wherein the controller is designed to determine how an optical axis of the receiving device has to be oriented to reduce the angular deviations of the two detectors.

14. A system for measuring a trajectory of a target object, the system comprising:
    a measuring apparatus comprising:
        a receiving device having a primary mirror and a secondary mirror;
        a first detector configured to detect first electromagnetic radiation having a first wavelength;
        wherein the first detector is further configured to provide signals based on which a rough position of the target object with a first accuracy is determinable;
        a second detector configured to detect second electromagnetic radiation having a second wavelength;

wherein the second detector is further configured to provide signals based on which a fine position of the target object with a second accuracy that is greater than the first accuracy is determinable;

wherein the primary mirror is designed to reflect the first electromagnetic radiation and the second electromagnetic radiation and to direct said radiation onto a focal region;

wherein the secondary mirror is arranged between the primary mirror and the focal range and is designed to reflect only the second electromagnetic radiation in the direction of the second detector; and wherein the first detector is arranged behind the secondary mirror in the focal region of the primary mirror; and a radar apparatus for radiating radar radiation as the first electromagnetic radiation.

15. A method for measuring a trajectory of a target object, the method comprising the steps of:

receiving first electromagnetic radiation reflected from the target object in a receiving device which comprises a primary mirror and a secondary mirror;

reflecting the first electromagnetic radiation onto a first detector by way of the primary mirror;

determining a rough position of the target object with a first accuracy from signals of the first detector;

directing the receiving device at the target object by way of the rough position;

receiving in the receiving device second electromagnetic radiation reflected from the target object;

reflecting onto a second detector the second electromagnetic radiation by way of the primary mirror and the secondary mirror; and determining, from the signals of the second detector, a fine position of the target object with a second accuracy that is greater than the first accuracy.

* * * * *